United States Patent [19]

Moran

[11] Patent Number: 5,321,598
[45] Date of Patent: Jun. 14, 1994

[54] THREE-PHASE ACTIVE FILTER UTILIZING ROTATING AXIS TRANSFORMATION

[75] Inventor: Steven A. Moran, Pittsburgh, Pa.

[73] Assignee: Westinghouse Electric Corp., Pittsburgh, Pa.

[21] Appl. No.: 946,734

[22] Filed: Sep. 18, 1992

[51] Int. Cl.$^5$ .......................................... H02M 7/5395
[52] U.S. Cl. ........................................ 363/41; 363/74; 363/98; 363/132; 323/207
[58] Field of Search ........................ 363/39, 40, 41, 43, 363/74, 78, 95, 98, 131, 132; 307/105-108, 39; 323/205, 207-210; 320/1

[56] References Cited

U.S. PATENT DOCUMENTS

| | | | |
|---|---|---|---|
| 3,825,815 | 7/1974 | Gyugyi et al. | 321/9 A |
| 4,479,082 | 10/1984 | Schauder et al. | 318/799 |
| 4,651,265 | 3/1987 | Stacey et al. | 363/35 |
| 4,707,651 | 11/1987 | Schauder | 318/800 |
| 4,713,745 | 12/1987 | Schauder | 363/161 |
| 4,812,669 | 3/1989 | Takeda et al. | 307/105 |
| 4,862,054 | 8/1989 | Schauder | 318/800 |
| 4,885,518 | 12/1989 | Schauder | 318/798 |
| 4,962,339 | 10/1990 | Schauder | 318/798 |
| 5,005,115 | 4/1991 | Schauder | 363/159 |
| 5,063,532 | 11/1991 | Takeda et al. | 364/825 |
| 5,182,463 | 1/1993 | Yamamoto et al. | 307/46 |

*Primary Examiner*—Steven L. Stephan
*Assistant Examiner*—Adolf Berhane
*Attorney, Agent, or Firm*—Norman A. Nixon

[57] ABSTRACT

A three-phase active filter for connection into a three-phase power distribution system to compensate undesirable harmonic deviations. A converter is electrically connected between the power distribution system and a DC energy storage element. The converter is selectively controlled by control means to effectuate a flow of energy between the system and the storage element to offset the harmonic deviations. To improve the dynamic response of the filter, the control means utilize vector control principles. Specifically, a synchronous fundamental vector of AC energy waveforms in the power distribution system is derived in a rotating reference frame. Fundamental reference signals are then produced in a stationary reference frame which are compared with corresponding actual condition signals. Error signals thus produced are then utilized to operate the converter. To compensate losses in the storage element and inverter, the control means preferably further comprise loss compensation means also utilizing vector control principles.

12 Claims, 4 Drawing Sheets

THREE-PHASE ACTIVE FILTER UTILIZING ROTATING AXIS TRANSFORMATION

BACKGROUND OF THE INVENTION

1. Field of the Invention

The present invention relates to a three-phase active filter for compensating undesirable harmonic deviations in AC energy delivered from a three-phase AC source to a three-phase load. More particularly, the invention relates to such an active filter having a control scheme utilizing vector control principles.

2. Description of the Prior Art

In a three-phase power distribution system wherein a three-phase AC source is feeding a three-phase load, undesirable harmonic deviations are often generated on the interconnecting supply line. These harmonic deviations result in harmonic distortion which can cause problems in the reliable operation of harmonic sensitive components in the system. Particularly, non-linear loads such as rectifiers, power converters, and other types of power electronic equipment may draw rectangular or pulsed currents from the source which consist of a fundamental component and a series of harmonics. The current harmonics may create a voltage drop across the source impedance which results in harmonic distortion of the voltage seen by the load.

To reduce these harmonics and the concomitant distortion, various active power filter arrangements have been utilized. Originally, such filters generally fell into one of two categories: (1) those using controllable impedance or admittance as the active element, and (2) those using linear power amplifiers controlled by various feedback techniques. The first type had relatively low efficiency and was thus considered not well suited for power applications. The second type tended to be cost prohibitive in relatively high power applications.

A third type of active filter was later developed to overcome some of these deficiencies. This filter utilizes a current or voltage "generator" selectively controlled to produce a flow of energy matching and compensating the harmonic components to be eliminated. A nearly ideal filter characteristic is thus produced at the point of connection into the system. Filters of this type in single-phase systems are disclosed and described in U.S. Pat. No. 3,825,815, issued Jul. 23, 1974 to Gyugyi et al. Three-phase power distribution systems utilizing such filters are illustrated in U.S. Pat. No. 4,651,265, issued to Stacey et al. on Mar. 17, 1987. Both of these patents are incorporated herein by reference.

SUMMARY OF THE INVENTION

Three-phase active filters practicing the present invention have control means utilizing vector control principles. Specifically, referencing means are utilized to derive in a rotating reference frame a synchronous fundamental vector from AC waveforms appearing on the supply line interconnecting a three-phase AC source and a three-phase load. Fundamental reference signals are then produced in a stationary reference frame. Comparator means respectively compare the reference signals with signals proportional to the actual waveforms. Resulting respective error signals may then be processed to control an interposing converter electrically connected between the supply line and a DC energy storage element. A flow of energy is thus selectively produced between the energy storage element and the supply line to offset undesirable harmonic deviations.

In presently preferred embodiments, signals representative of respective phase components of a synchronously rotating line voltage vector are input into a three-phase to two-phase network to produce respective direct stationary (ds-axis) and quadrature stationary (qs-axis) component signals. A vector phase locked loop or other tracking means measures a displacement angle between the ds-axis and the line voltage vector and produces a representative angle signal. Based on the angle signal, a stationary-to-rotating transformation network then produces respective corresponding direct (d-axis) and quadrature (q-axis) component signals in a synchronously rotating reference frame. The d-axis and q-axis component signals are next passed to filtering means for derivation of the synchronous fundamental component of the line voltage vector. Components of this synchronous fundamental vector are passed to a rotating-to-stationary transformation network to produce ds-axis and qs-axis component reference signals based on the accrued value of the angle signal. Phase reference signals are then obtained using the two-phase to three-phase circuitry. The phase reference signals may be subtracted from the actual proportional phase signals to yield the error signals.

In order to restore losses occurring in physical realizations of the filter, loss compensation means may also be provided to maintain the energy level on the DC energy storage element at a predetermined constant value. In presently preferred embodiments, an energy level error signal is obtained and preferably processed by a proportional plus integral controller. A DC loss compensation signal thus produced is passed to appropriate means for producing a loss compensation vector having respective phase loss compensation components. The loss compensation components are then added to the phase error signals used to operate the converter.

DETAILED DESCRIPTION OF PRESENTLY PREFERRED EMBODIMENTS

In accordance with the invention, an improved three-phase active filter may be provided having improved dynamic response for compensating undesirable harmonic deviations in AC energy waveforms on a three-phase supply line. Harmonic distortion is reduced, thus enhancing reliable operation of harmonic sensitive equipment in the system.

Figure 1:
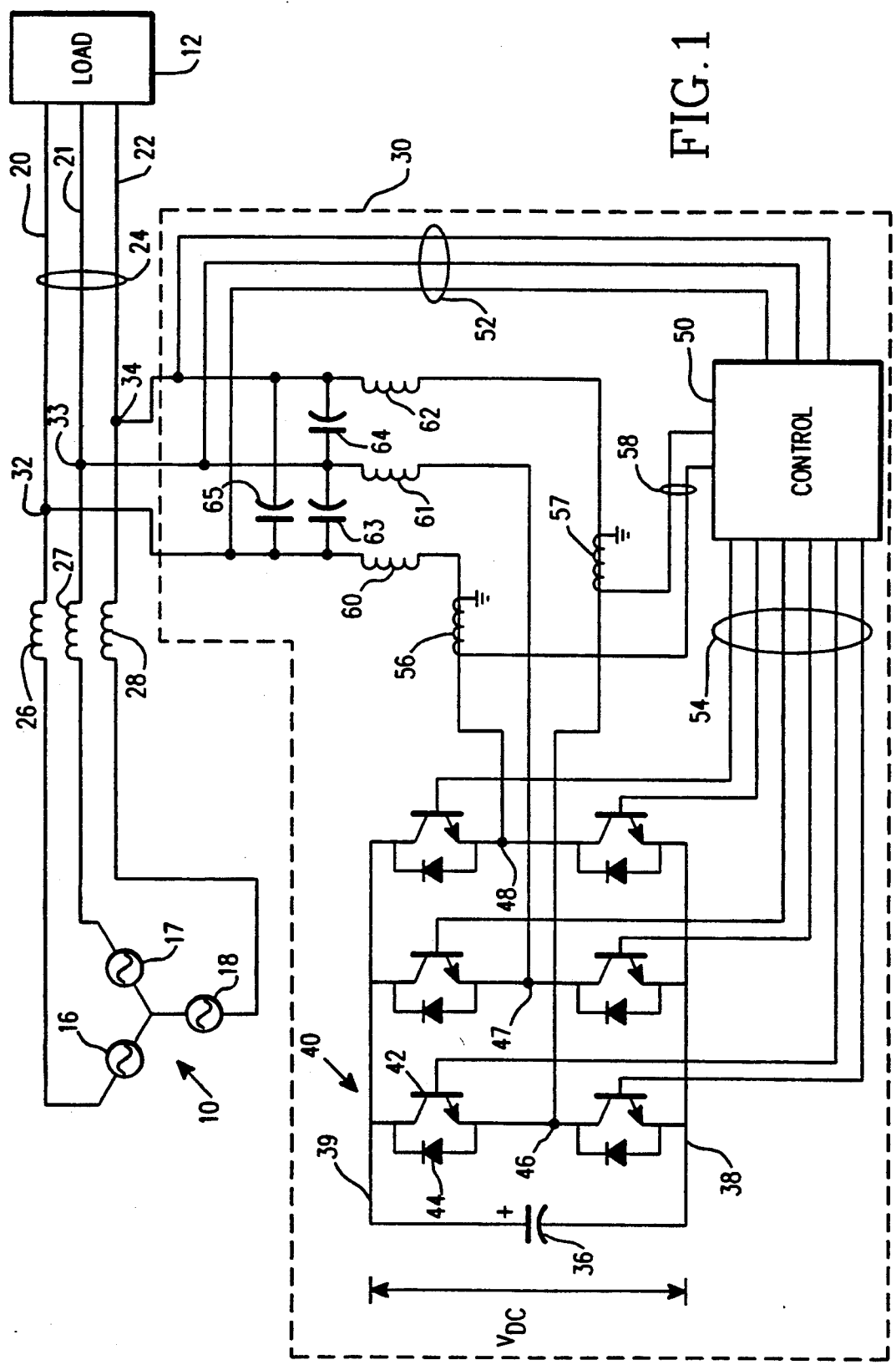
FIG. 1 is a schematic diagram in a presently preferred embodiment of the three-phase active filter of the invention connected to a three-phase supply line intermediate a three-phase source and a three-phase load.
Figure 1A:
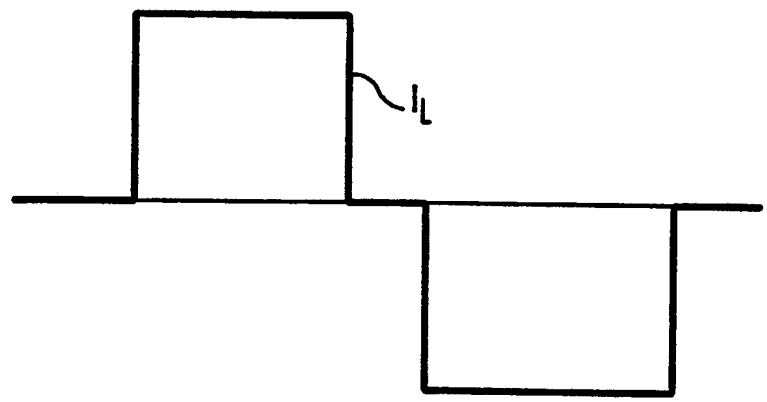
FIG. 1A illustrates a current waveform such as may be drawn by one phase of a non-linear three-phase load.
Figure 1B:
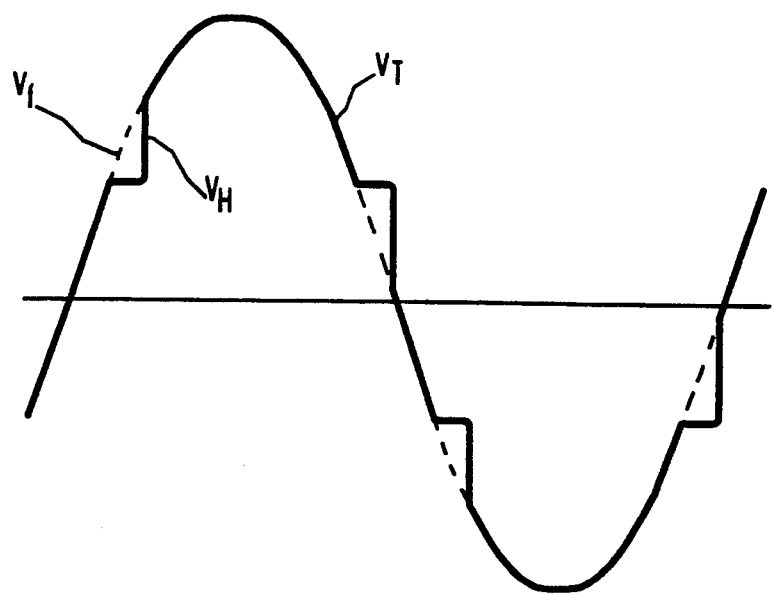
FIG. 1B is a waveform illustrating voltage harmonic distortion to the fundamental voltage waveform such as may result from the non-linear current in FIG. 1A.

FIG. 1 illustrates a three-phase power distribution system suitable for filtering according to the teachings of the present invention. AC source 10 has respective phase voltage sources 16, 17 and 18 individually supplying load 12 over respective conductors 20, 21 and 22 (of three-phase supply line 24). Nonlinear phase currents drawn by switching semiconductors or other nonlinear elements within load 12 produce harmonic voltage drops across source impedances 26, 27 and 28, resulting in harmonic distortion in respective voltage waveforms on conductors 20, 21 and 22. For example, FIG. 1A illustrates a nonlinear pulse phase current $I_L$ typically drawn by power semiconductor equipment. As a result, total phase voltage waveform $V_T$ (as shown in FIG. 1B) comprises the sum of the fundamental voltage $V_f$ plus undesirable harmonic deviation $V_H$. To reduce voltage waveform distortion caused by these harmonic deviations, a three-phase parallel active filter 30 constructed according to the teachings of the invention is connected into the system at nodal connections 32, 33 and 34.

Generally, filter 30 comprises at least one storage capacitor 36 connected across respective DC terminals 38 and 39 of three-pole bridge inverter 40. Each pole of inverter 40 comprises a pair of semiconductor switching devices, such as transistor 42, serially connected between DC terminals 38 and 39. In addition to ordinary switching power transistors, other suitable semiconductor switching devices include IGBTs, GTOs and MCTs. The nodal connections 46, 47 and 48 intermediate the serially connected transistors of each pole define respective AC terminals.

Control means 50 monitor instantaneous voltage waveforms appearing at connections 32, 33 and 34 via phase voltage input line 52. Firing signals to gate the switching devices are fed from control means 50 over output line 54. Current sensors, such as current transformers 56 and 57, supply current feedback over feedback line 58 to further adjust the firing signals.

Filter 30 generates the harmonic currents required by nonlinear load 12. Specifically, control means 50 operates inverter 40 to supply currents from stored energy on capacitor 36 to line 24 if the respective phase voltages are lower than an ideal fundamental sine wave. Similarly, filter 30 sinks current if the respective phase voltages are higher than ideal. Thus, a magnitude and direction of a flow of energy is controlled to maintain sinusoidal voltages at nodal connection 32, 33 and 34. Broadband compensation of the actual load harmonic currents is thus provided, as opposed to the "theoretical" harmonics as is the case with passive harmonic filters.

In order to minimize circuit losses and thus increase the system efficiency, inverter 40 is pulse width modulated. Of course, this process also produces its own harmonics. By operating the transistors at a sufficiently high rate, the frequency of the switching harmonics can be kept relatively high. Such high frequencies can be easily removed by a LC filter network comprising inductors 60, 61, 62 and capacitors 63, 64, 65.

Figure 2:
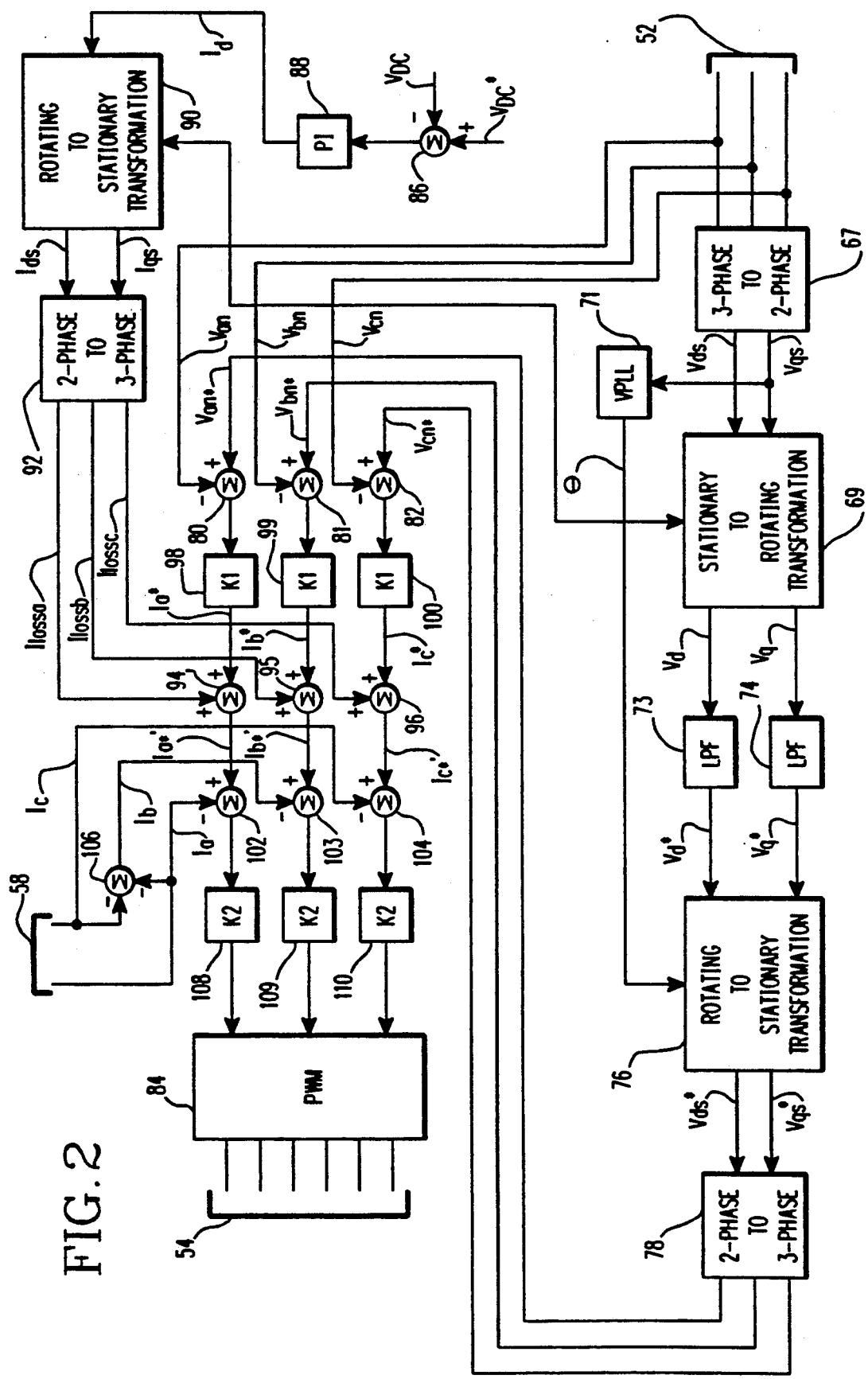
FIG. 2 is a diagrammatic representation of a presently preferred control scheme for use in the three-phase active filter of the invention.
Figure 2A:
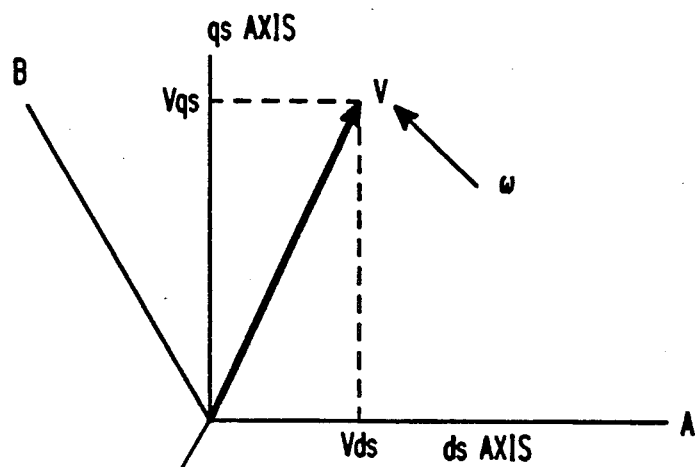
FIG. 2A is a graphical representation of a three-phase line voltage vector in terms of ds-axis and qs-axis components.
Figure 2B:
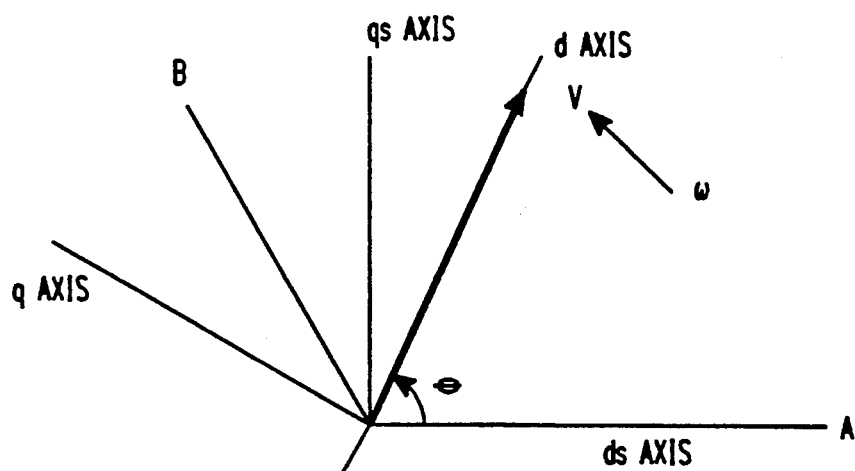
FIG. 2B is a graphical representation of the line voltage vector of FIG. 2A in a synchronously rotating reference frame.

Referring to FIG. 2, a presently preferred scheme for the implementation of control means 50 is illustrated. To improve dynamic response of filter 30, the scheme utilizes coordinate transformations and vector control principles. These principles can be best illustrated with initial reference to FIGS. 2A and 2B. At steady-state, the instantaneous line-to-neutral voltages $V_{an}$, $V_{bn}$ and $V_{cn}$ appearing on supply line 24 may be represented by a single vector (or complex number) in a two dimensional plane. These phase voltages are equal to the vertical projections of the vector on each of three axis (A, B, C) symmetrically displaced by 120° in the complex plane. The resultant line voltage vector V rotates about the origin of axes A, B, C with an angular frequency $\omega$ equal to the fundamental frequency of AC source 10 (expressed in rad/sec). Instead of expressing the vector in terms of its phase voltage components, the reference frame may be redefined to have a ds-axis (equal to the A-axis) and an orthoginal qs-axis. In this way, vector V may be redefined in terms of only two components, $V_{ds}$ and $V_{qs}$. This relationship is illustrated mathematically as follows:

$$\begin{bmatrix} V_{ds} \\ V_{qs} \end{bmatrix} = \sqrt{2/3} \begin{bmatrix} 1 & -\tfrac{1}{2} & -\tfrac{1}{2} \\ 0 & \sqrt{3/2} & \sqrt{3/2} \end{bmatrix} \begin{bmatrix} V_{an} \\ V_{bn} \\ V_{an} \end{bmatrix}$$

The two components, $V_{ds}$ and $V_{qs}$, can be respectively regarded as a real and imaginary parts of a complex number. Thus, at a particular instant in time, V is defined as $V = V_{ds} + jV_{qs}$.

As stated above, the line voltage vector rotates in the complex plane with angular frequency $\omega$ equal to the fundamental frequency of AC source 10. Under this condition, $V = V_o e^{j\theta}$ (where $V_o$ is a complex constant and $\theta$ is the elapsed angle ($\omega t$) between V and the ds-axis). Multiplication of the line voltage vector V by a complex quantity $e^{-j\theta}$ is equivalent, in effect, to rotating the coordinate axis of the complex plane with an angular velocity $\omega$ and then expressing the vector V in terms of coordinates relative to the new rotating axes. The rotating axes are respectively designated the d-axis and the q-axis. If the reference frame rotates at the angular velocity $\omega$, then vector V becomes equal to complex constant $V_o$. Harmonics present in the line voltage waveforms, however, will cause magnitude and phase variations in vector V. Therefore, in the rotating reference frame, signal $V_d$ will consist of a constant component corresponding to the fundamental, and an AC component corresponding to the harmonics. The $V_q$ signal will have, in steady state, a DC component of zero and an AC component corresponding to the harmonics present in the output voltage. The stationary-to-rotating transformation expressed mathematically as follows:

$$\begin{bmatrix} V_d \\ V_q \end{bmatrix} = \begin{bmatrix} \cos\theta & \sin\theta \\ -\sin\theta & \cos\theta \end{bmatrix} \begin{bmatrix} V_{ds} \\ V_{qs} \end{bmatrix}$$

To convert the signals $V_d$ and $V_q$ back to the individual phase components, the following inverse transformations may be used:

$$\begin{bmatrix} V_{ds} \\ V_{qs} \end{bmatrix} = \begin{bmatrix} \cos\theta & -\sin\theta \\ \sin\theta & \cos\theta \end{bmatrix} \begin{bmatrix} V_d \\ V_q \end{bmatrix}$$

$$\begin{bmatrix} V_{an} \\ V_{bn} \\ V_{an} \end{bmatrix} = \sqrt{2/3} \begin{bmatrix} 1 & 0 \\ -\tfrac{1}{2} & \sqrt{3}/2 \\ -\tfrac{1}{2} & -\sqrt{3}/2 \end{bmatrix} \begin{bmatrix} V_{ds} \\ V_{qs} \end{bmatrix}$$

Referring again to FIG. 2, voltage signals proportional to voltages $V_{an}$, $V_{bn}$ and $V_{cn}$ are received at 52 by a three-phase to two-phase network 67. Network 67 produces stationary reference frame component signals $V_{ds}$ and $V_{qs}$, which are then passed to stationary-to-rotating transformation network 69. To perform this transformation, network 69 also receives an angle signal representative of the angle $\theta$ which has preferably been produced by a vector phase locked loop ("VPLL") network 71. Transformation network 69 outputs respective direct and quadrature component signal $V_d$ and $V_q$ in the synchronously rotating reference frame.

These signals are then passed through filtering means to eliminate AC components. Specifically, signal $V_d$ is fed to low pass filter ("LPF") 73 to produce corresponding component reference signal $V_d^*$. Similarly, signal $V_q$ is passed through LPF 74 to produce component reference signal $V_q^*$. Utilizing the angle signal, rotating-to-stationary transformation network 76 receives component signals $V_{dl}*$ and $V_q^*$ and produces stationary reference component signals $V_{ds}^*$ and $V_{qs}^*$. Two-phase to three-phase network 78 then obtains phase component reference signals $V_{an}^*$, $V_{bn}^*$ and $V_{cn}^*$, which represent the respective fundamentals of phase signals $V_{an}$, $V_{bn}$ and $V_{cn}$.

To determine the harmonics present in the actual phase signals, comparator means are provided to compare these reference signals with their associated actual condition phase signals. Toward this end, summing junction 80 produces an error signal output based on the difference between reference signal $V_{an}^*$ and signal $V_{an}$. Likewise, summing junctions 81 and 82 respectively compare signals $V_{bn}^*$ and $V_{cn}^*$ with signals $V_{bn}$ and $V_{cn}$. These error signals form the basis of controlling inverter 40. However, to be most useful with pulse-width modulator ("PWM") 84 and to compensate for energy losses occurring within filter 30 itself, the error signals are preferably further processed.

If all components within filter 30 were ideal and thus lossless, proper filtering action would be ensured if capacitor 36 were initially charged to a certain desired predetermined value. In order to maintain this predetermined value constant in actual realizations of filter 30, loss compensation means are provided to modify the phase error signals. In accordance with the invention, the loss compensation means may also utilize vector control principles to optimize performance.

The actual voltage, $V_{DC}$, appearing on capacitor 36 is compared at summing junction 86 with a signal $V_{DC}^*$ representing the predetermined constant value that should be maintained on capacitor 36. An error signal thus produced is passed to a proportional plus integral ("PI") controller 88. The output of PI controller 88 is fed to a rotating-to-stationary transformation network 90 as the d-axis input, $I_d$, of a loss current vector. Network 90 then produces loss current vector components $I_{ds}$ and $I_{qs}$ in a stationary reference frame. Signals $I_{ds}$ and $I_{qs}$ are passed to two-phase to three-phase network 92 which produces phase loss compensation components $I_{LOSSa}$, $I_{LOSSb}$ and $I_{LOSSc}$. The loss compensation components are respectively fed to summing junctions 94, 95 and 96, where they are added to current reference signals $I_a^*$, $I_b^*$ and $I_c^*$.

Signals $I_a^*$, $I_b^*$ and $I_c^*$ were obtained by passing the phase voltage error signals through transfer networks 98, 99 and 100, each having a proportional gain K1. The resulting current reference signals $I_a^{*\prime}$, $I_b^{*\prime}$ and $I_c^{*\prime}$ output by summing junctions 94, 95 and 96 are respectively fed to summing junctions 102, 103 and 104. There, they are compared with associated current feedback signals $I_a$, $I_b$ and $I_c$. Signals $I_a$ and $I_c$ are obtained directly at 58. Signal $I_b$ is the negative sum of signals of $I_a$ and $I_c$ and is thus obtained as the output of negative summing junction 106. Current error signals produced at junctions 102, 103 and 104 are then passed to respective transfer networks 108, 109 and 110, each having a proportional gain K2. Outputs of transfer networks 108, 109 and 110 are received by PWM 84, which delivers (at 54) firing signals to gate inverter 40.

Although certain preferred embodiments of the invention and certain preferred method of practicing the same have been described and shown herein, it is to be understood that various other embodiments and modifications can be made within the scope of the following claims.

I claim:

1. A three-phase active filter for electrical connection to a three-phase supply line intermediate a three-phase AC source and a three-phase load to compensate undesirable harmonic deviations in AC energy waveforms on said supply line, said filter comprising:

a DC energy storage element;

an interposing converter electrically connected to said DC energy storage element and further electrically connectable to said supply line for selectively effectuating a flow of energy therebetween to offset said undesirable harmonic deviations;

control means operatively connected to said interposing converter for controlling a magnitude and direction of said flow of energy;

said control means having referencing means for deriving a synchronous fundamental vector of said AC energy waveforms in a rotating reference frame and producing fundamental reference signals in a stationary reference frame;

said control means further having comparator means for respectively comparing said fundamental reference signals with signals proportional to said AC energy waveforms to produce respective error signals forming a basis of controlling said magnitude and said direction of said flow of energy;

wherein said control means further comprises loss compensation means operative to modify said error signals for maintaining DC energy stored by said DC energy storage element at a predetermined constant value;

means for producing an energy level error signal based on a difference between an actual stored energy level and said predetermined constant value;

transfer function means for receiving said energy level error signal and producing a DC loss compensation signal;

means for receiving said DC loss compensation signal and producing a loss compensation vector having respective loss compensation components; and summing means for respectively adding said loss compensation signals to said error signals.

2. The three-phase active filter of claim 1 wherein said transfer function means comprises a proportional plus integral controller.

3. The three-phase active filter of claim 1 wherein said means for receiving said DC loss compensation signal and producing a loss compensation vector having respective loss compensation components comprises:
- a rotating-to-stationary transformation network receiving said DC loss compensation signal as a d-axis component and producing said loss compensation vector having corresponding ds-axis and qs-axis components; and
- a two-phase to three-phase network receiving said ds-axis and qs-axis components and producing said loss compensation components.

4. The three-phase active filter of claim 1 wherein said reference means comprises:
- means for detecting respective phase components of an AC energy vector on said supply line;
- means for resolving said phase components into a d-axis and q-axis component in a rotating reference frame;
- low-pass filtering means receiving said d-axis and q-axis component signals for producing respective corresponding d-axis and q-axis component reference signals; and
- means for transforming said d-axis and q-axis component reference signals into phase components in a stationary reference frame.

5. The three-phase active filter of claim 1 wherein said reference means comprises:
- a three-phase to two-phase network receiving phase voltage signals proportional to respective phase voltage components of a line voltage vector and producing ds-axis and qs-axis component signals;
- tracking means for producing an angle signal representative of a displacement angle between said ds-axis and said line voltage vector;
- a stationary-to-rotating transformation network receiving said ds-axis and qs-axis component signals and said angle signal and producing respective corresponding d-axis and q-axis component signals in a reference frame rotating at an angular velocity equal to a fundamental frequency of said AC source;
- filtering means for receiving said d-axis and q-axis component signals and producing respective corresponding d-axis and q-axis component reference signals;
- a rotating-to-stationary transformation network receiving said d-axis and q-axis component reference signals and said angle signal and producing respective corresponding ds-axis and qs-axis component reference signals in a stationary reference frame; and
- two-phase to three-phase circuitry receiving said ds-axis and qs-axis component signals and producing said phase reference signals.

6. The three-phase active filter of claim 5 wherein said filtering means includes at least one low pass filter.

7. The three-phase active filter of claim 5 wherein said tracking means comprises a vector phase locked loop network.

8. The three-phase active filter of claim 1 wherein said DC energy storage element comprises at least one storage capacitor.

9. The three-phase active filter of claim 1 wherein said converter means comprises a bridge inverter having three inverter poles connected across a pair of DC terminals, each inverter pole having a pair of serially connected semiconductor pole switches having connected thereacross respective antiparallel diodes.

10. The three-phase active filter of claim 9 wherein said control means further comprises a pulse width modulator supplying respective firing signals to said semiconductor pole switches of said bridge inverter.

11. The three-phase active filter of claim 10 further comprising passive filtering means for filtering switching harmonics caused by pulse width modulated switching of said semiconductor pole switches.

12. A method of reducing voltage harmonic distortion on a three-phase supply line interconnecting a three-phase AC source feeding a nonlinear three-phase load, said method comprising the steps of:
(a) sensing a line voltage vector appearing on said supply line;
(b) producing an angle signal representative of an instantaneous angle between said actual line voltage vector and a predetermined stationary axis;
(c) producing from said line voltage vector and said angle signal respective d-axis and q-axis components of said line voltage vector in a reference frame rotating with an angular velocity equal to a fundamental frequency of said actual line voltage vector;
(d) filtering AC components appearing in said d-axis and q-axis components to produce d-axis and q-axis reference signals;
(e) producing from said d-axis and q-axis reference signals and said angle signal a line voltage reference vector proportional to a fundamental component of said line voltage vector;
(f) calculating an error difference between respective phase components of said line voltage vector and said line voltage reference vector; and
(g) selectively communicating energy between said supply line and an energy storage element based on said error difference.

* * * * *